(12) United States Patent  (10) Patent No.: US 9,065,513 B2
Nogami et al. (45) Date of Patent: Jun. 23, 2015

(54) TERMINAL APPARATUS, BASE-STATION APPARATUS, COMMUNICATION SYSTEM, AND COMMUNICATION METHOD

(75) Inventors: Toshizo Nogami, Osaka (JP); Kazuyuki Shimezawa, Osaka (JP); Tatsushi Aiba, Osaka (JP); Shoichi Suzuki, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 105 days.

(21) Appl. No.: 13/989,722

(22) PCT Filed: Nov. 18, 2011

(86) PCT No.: PCT/JP2011/076686
§ 371 (c)(1),
(2), (4) Date: May 24, 2013

(87) PCT Pub. No.: WO2012/070497
PCT Pub. Date: May 31, 2012

(65) Prior Publication Data
US 2013/0244587 A1  Sep. 19, 2013

(30) Foreign Application Priority Data

Nov. 26, 2010  (JP) .................................. 2010-263657

(51) Int. Cl.
*H04B 1/00* (2006.01)
*H04B 7/00* (2006.01)
*H04B 7/06* (2006.01)
*H04L 5/00* (2006.01)

(52) U.S. Cl.
CPC ............ *H04B 7/0619* (2013.01); *H04L 5/0023* (2013.01); *H04L 5/0053* (2013.01)

(58) Field of Classification Search
CPC ............................ H04B 7/0619; H04L 5/0025
USPC ........................................................ 455/70
See application file for complete search history.

(56) References Cited

FOREIGN PATENT DOCUMENTS

WO  WO 2009/088225 A2  7/2009

OTHER PUBLICATIONS

3GPP TS36. 213 V8. 8. 0 (2009-9), "3rd Generation Partnership Project; Technical Specification Group Radio Access Network; Evolved Universal Terrestrial Radio Access (E-UTRA); Physical layer procedures (Release 8)", Technical Specification, pp. 1-77, Dec. 2008.

(Continued)

*Primary Examiner* — Eugene Yun
(74) *Attorney, Agent, or Firm* — Birch, Stewart, Kolasch & Birch, LLP

(57) ABSTRACT

A base-station apparatus (101) and a terminal apparatus (102) communicate with each other in a communication system. When reporting reception quality information together with data to the base-station apparatus via a channel for use in data transmission, the terminal apparatus reports the reception quality information using a spatial multiplexing method identical to a spatial multiplexing method of the data if the reception quality information is reception quality information that is to be nonperiodically reported, and reports the reception quality information using a spatial multiplexing method independent of the spatial multiplexing method of the data if the reception quality information is reception quality information that is to be periodically reported. When extracting the reception quality information reported together with the data from the terminal apparatus, the base-station apparatus extracts the reception quality information based on the assumption that the spatial multiplexing method of the reception quality information is identical to the spatial multiplexing method of the data if the reception quality information is nonperiodically reported, and extracts the reception quality information based on the assumption that the spatial multiplexing method of the reception quality information is independent of the spatial multiplexing method of the data if the reception quality information is periodically reported.

4 Claims, 12 Drawing Sheets

(56) References Cited

OTHER PUBLICATIONS

3GPP TSG RAN WG1 Meeting #61, R1-103259, "View on CSI Reporting Scheme Based on Double Codebook Structure for LTE-Advanced", NTT DOCOMO, Agenda Item: 6.3.4, pp. 1-5, May 10-14, 2010.

International Search Report, mailed Feb. 14, 2012, issued in PCT/JP2011/076686.

104: FEEDBACK OF RI/PTI/PI1/PI2/CQI AND TRANSMISSION OF UPLINK DATA

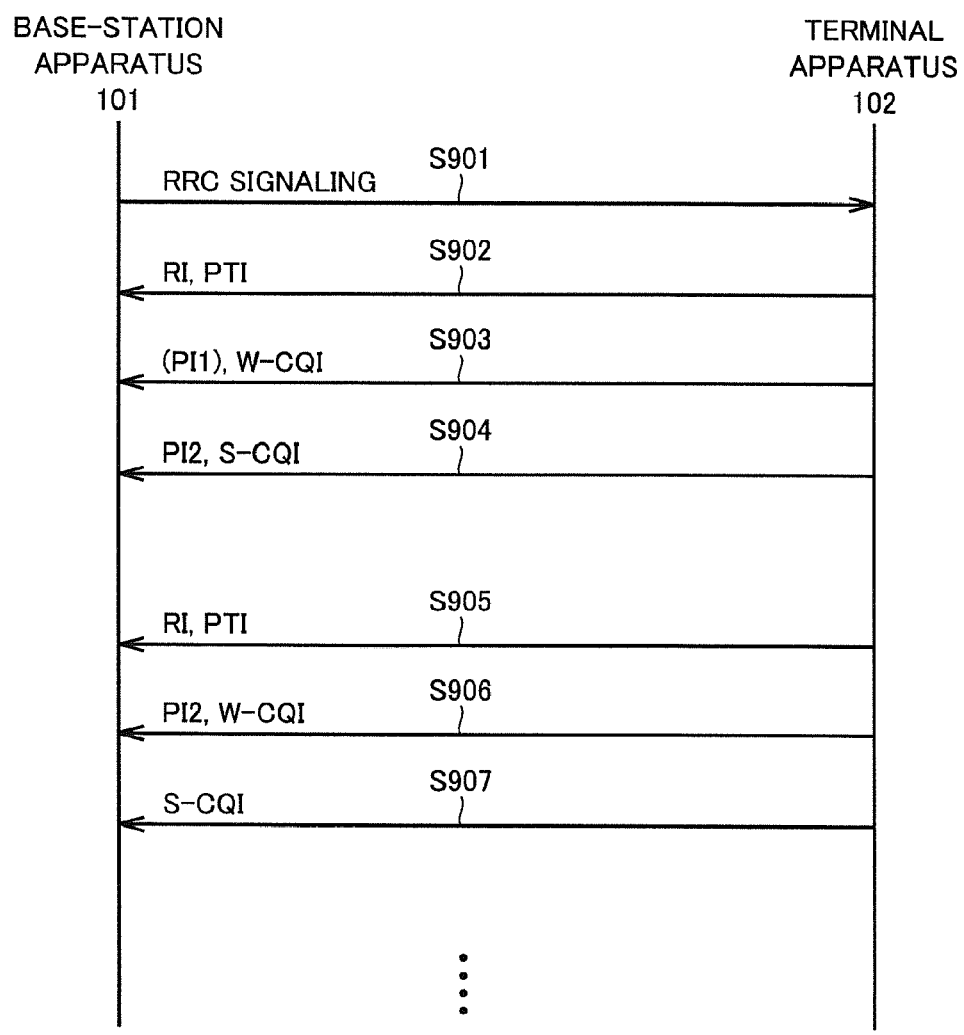

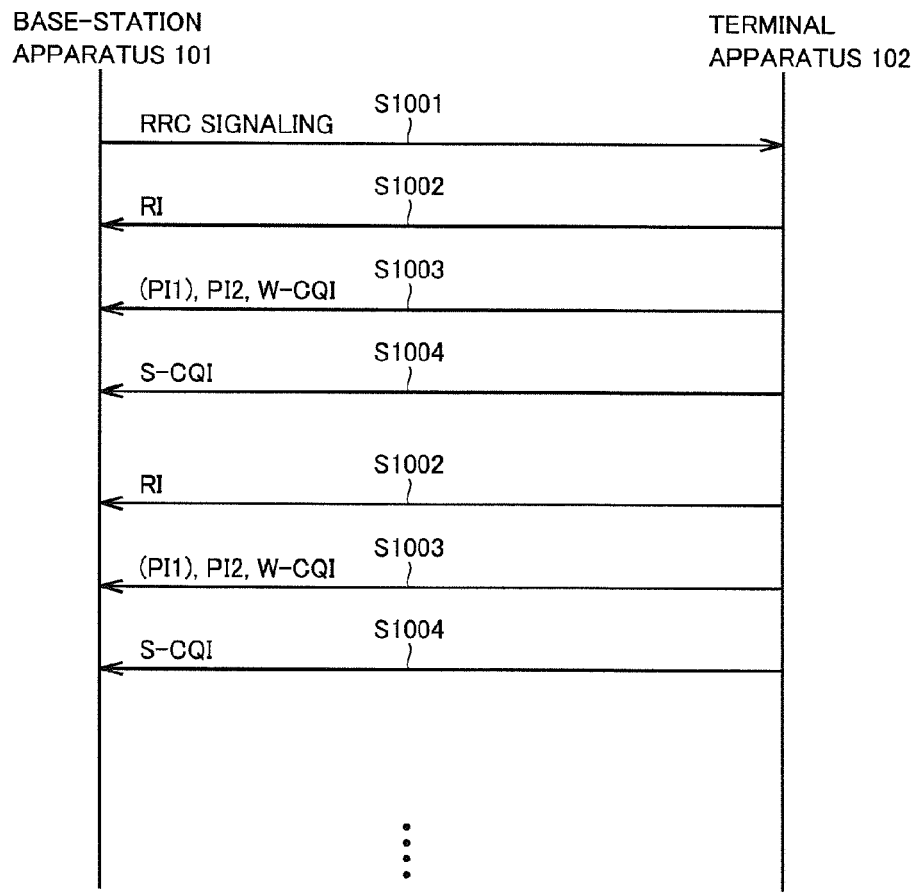
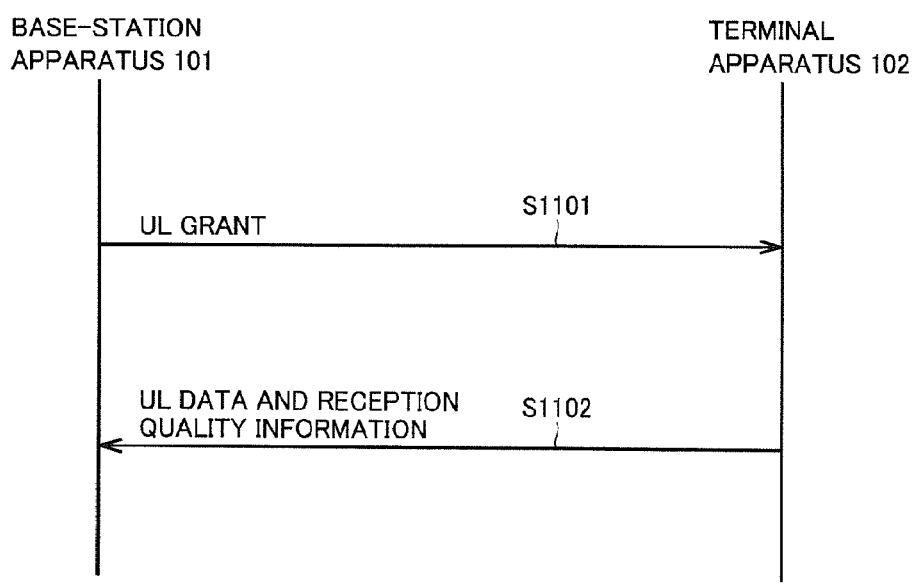

1303
1301
1304: RI/PMI/CQI FEEDBACK
1302

TERMINAL APPARATUS, BASE-STATION APPARATUS, COMMUNICATION SYSTEM, AND COMMUNICATION METHOD

TECHNICAL FIELD

The present invention relates to a terminal apparatus, a base-station apparatus, a communication system, and a communication method.

BACKGROUND ART

A variety of mobile radio communication systems is conventionally known. Such systems include WCDMA (Wideband Code Division Multiple Access), LTE (Long Term Evolution), and LTE-A (LTE Advanced), standardized by 3GPP (Third Generation Partnership Project), and WiMAX (Worldwide Interoperability for Microwave Access) standardized by IEEE 802.16 committees. In these mobile radio communication systems, a coverage area of base-station apparatuses (a base station, a transmission station, a downlink transmitter apparatus, an uplink transmitter apparatus, eNodeB) or a transmission station functioning in practice as a base-station is cellular-structured into a plurality of cells to expand a communication area.

With frequencies different between adjacent cells or between adjacent sectors used, terminal apparatuses (a mobile station, a receiver station, an uplink transmitter apparatus, a downlink receiver apparatus, a mobile terminal, and UE: User Equipment) in a cell edge area or a sector edge area may perform communications in a manner free from interference from signals transmitted from a plurality of base stations. However, in such an arrangement, a frequency usage rate is low. On the other hand, the use of the same frequency on adjacent cells or on adjacent sectors may increase the frequency usage rate. In such a case, however, a remedial step becomes necessary for a terminal apparatus in the cell edge area against interferences.

More efficient data transmission may be achieved by adaptively controlling a modulation method and an encoding ratio (MCS: Modulation and Coding Scheme), spatial multiplexing count (the number of layers, and ranks), and precoders in response to a transmission status between a base station and a terminal apparatus. Non Patent Literature 1 below describes the method of controlling the modulation method and the encoding ratio.

FIG. 13 illustrates a base station 1301 and a terminal apparatus 1302 in the LTE. When MCS, the spatial multiplexing count and the precoder are adaptively controlled on a transmitted downlink transmission signal 1303 in the LTE of FIG. 13, the terminal apparatus 1302 performs the following process. Specifically, the terminal apparatus 1302 calculates reception quality information by referencing a downlink reference signal (RS: Reference Signal) included in a downlink transmission signal 1303 transmitted from the base station 1301. The reception quality information typically includes a rank indicator RI (Rank Indicator) specifying an appropriate spatial multiplexing count, a precoding matrix indicator PMI (Precoding Matrix Indicator) specifying a preferred precoder, and a channel quality indicator CQI (Channel Quality Indicator) specifying an appropriate transmission rate. The terminal apparatus 1302 reports the calculated reception quality information to the base station 1301 via an uplink channel 1304.

CITATION LIST

Non Patent Literature

NPL 1: 3rd Generation Partnership Project; Technical Specification Group Radio Access Network; Evolved Universal Terrestrial Radio Access (E-UTRA); Physical layer procedures (Release 8), December 2008, 3GPP TS36. 213 V8. 8. 0 (2009-9)

SUMMARY OF INVENTION

Technical Problem

In the conventional communication method, however, the process performed on the reception quality information remains fixed regardless of status when the reception quality information is transmitted as control signal via a channel for use in data transmission. The process thus serves as a factor that presents a difficulty in the increase of transmission efficiency.

In view of the above problem, the present invention has been developed. It is an object of the present invention to provide a terminal apparatus, a base-station apparatus, a communication system, and a communication method, according to which the reception quality information is efficiently reported when the reception quality information as the control information is transmitted via the channel for use in the data transmission.

Solution to Problem (1) The present invention has been developed to solve the above problem, and a terminal apparatus of an aspect of the present invention communicates with a base-station apparatus. When reporting reception quality information together with data to the base-station apparatus via a channel for use in data transmission, the terminal apparatus reports the reception quality information using a spatial multiplexing method identical to a spatial multiplexing method of the data if the reception quality information is reception quality information that is to be nonoperiodically reported, and reports the reception quality information using a spatial multiplexing method independent of the spatial multiplexing method of the data if the reception quality information is reception quality information that is to be periodically reported.

(2) The terminal apparatus of another aspect of the present invention is the terminal apparatus of the aspect (1), wherein the reception quality information is one piece of partial precoder information from among a plurality of pieces of partial precoder information specifying a preferred precoder.

(3) A terminal apparatus of another aspect of the present invention communicates with a base-station apparatus. When reporting reception quality information together with data to the base-station apparatus via a channel for use in data transmission, the terminal apparatus reports partial precoder information that specifies at least one candidate from among a plurality of candidates of preferred precoders if the reception quality information is reception quality information that is to be nonoperiodically reported, and reports partial precoder information that specifies at least one candidate from among a group of candidates within the plurality of candidates of preferred precoders if the reception quality information is reception quality information that is to be periodically reported.

(4) A base-station apparatus of another aspect of the present invention communicates with a terminal apparatus.

When extracting reception quality information reported together with data from the terminal apparatus via a channel for use in data transmission, the base-station apparatus extracts the reception quality information based on the assumption that a spatial multiplexing method of the reception quality information is identical to a spatial multiplexing method of the data if the reception quality information is nonperiodically reported, and extracts the reception quality information based on the assumption that the spatial multiplexing method of the reception quality information is independent of the spatial multiplexing method of the data if the reception quality information is periodically reported.

(5) The base-station apparatus of another aspect of the present invention is the base-station apparatus of the aspect (4), wherein the reception quality information is one piece of partial precoder information from among a plurality of pieces of partial precoder information specifying a preferred precoder.

(6) A base-station apparatus of another aspect of the present invention communicates with a terminal apparatus. When extracting reception quality information reported together with data from the terminal apparatus via a channel for use in data transmission, the base-station apparatus extracts partial precoder information that specifies at least one candidate from among a plurality of candidates of preferred precoders if the reception quality information is nonperiodically reported, and extracts partial precoder information that specifies at least one candidate from among a group of candidates within the plurality of candidates of the preferred precoders if the reception quality information is periodically reported.

(7) A communication system of another aspect of the present invention performs communications between a base-station apparatus and a terminal apparatus. The terminal apparatus, when reporting reception quality information together with data to the base-station apparatus via a channel for use in data transmission, reports the reception quality information using a spatial multiplexing method identical to a spatial multiplexing method of the data if the reception quality information is reception quality information that is to be nonperiodically reported, and reports the reception quality information using a spatial multiplexing method independent of the spatial multiplexing method of the data if the reception quality information is reception quality information that is to be periodically reported. The base-station apparatus, when extracting the reception quality information reported together with the data from the terminal apparatus, extracts the reception quality information based on the assumption that the spatial multiplexing method of the reception quality information is identical to the spatial multiplexing method of the data if the reception quality information is nonperiodically reported, and extracts the reception quality information based on the assumption that the spatial multiplexing method of the reception quality information is independent of the spatial multiplexing method of the data if the reception quality information is periodically reported.

(8) A communication system of another aspect of the present invention performs communications between a base-station apparatus and a terminal apparatus. The terminal apparatus, when reporting reception quality information together with data to the base-station apparatus via a channel for use in data transmission, reports partial precoder information that specifies at least one candidate from among a plurality of candidates of preferred precoders if the reception quality information is reception quality information that is to be nonperiodically reported, and reports partial precoder information that specifies at least one candidate from among a group of candidates within the plurality of candidates of the preferred precoders if the reception quality information is reception quality information that is to be periodically reported. The base-station apparatus, when extracting the reception quality information reported together with the data from the terminal apparatus, extracts partial precoder information that specifies at least one candidate from among a plurality of candidates of the preferred precoders if the reception quality information is nonperiodically reported, and extracts partial precoder information that specifies at least one candidate from among a group of candidates within the plurality of candidates of the preferred precoders if the reception quality information is periodically reported.

(9) A communication method of a terminal apparatus of another aspect of the present invention is a communication method for communication with a base-station apparatus, and includes, when reception quality information is transmitted together with data via a channel for use in data transmission, a step of reporting the reception quality information using a spatial multiplexing method identical to a spatial multiplexing method of the data if the reception quality information is reception quality information that is to be nonperiodically reported, and a step of reporting the reception quality information using a spatial multiplexing method independent of the spatial multiplexing method of the data if the reception quality information is reception quality information that is to be periodically reported.

(10) A communication method of a terminal apparatus of another aspect of the present is a communication method for communication with a base-station apparatus, and includes, when reception quality information is transmitted together with data via a channel for use in data transmission, a step of reporting partial precoder information that specifies at least one candidate from among a plurality of candidates of preferred precoders if the reception quality information is reception quality information that is to be nonperiodically reported, and a step of reporting partial precoder information that specifies at least one candidate from among a group of candidates within the plurality of candidates of the preferred precoders if the reception quality information is reception quality information that is to be periodically reported.

(11) A communication method of a base-station apparatus of another embodiment of the present invention is a communication method for communication with a terminal apparatus, and includes, when reception quality information reported together with data from the terminal apparatus via a channel for use in data transmission is extracted, a step of extracting the reception quality information based on the assumption that a spatial multiplexing method of the reception quality information is identical to a spatial multiplexing method of the data if the reception quality information is nonperiodically reported, and a step of extracting the reception quality information based on the assumption that the spatial multiplexing method of the reception quality information is independent of the spatial multiplexing method of the data if the reception quality information is periodically reported.

(12) A communication method of a base-station apparatus of another aspect of the present invention is a communication method for communication with a terminal apparatus, and includes, when reception quality information reported together with data from the terminal apparatus via a channel for use in data transmission is extracted, a step of extracting partial precoder information that specifies at least one candidate from among a plurality of candidates of preferred precoders if the reception quality information is nonperiodically reported, and a step of extracting partial precoder information that specifies at least one candidate from among a group of candidates within the plurality of candidates of the preferred precoders if the reception quality information is periodically reported.

Advantageous Effects of Invention

According to the present invention, reception quality information is efficiently reported when the reception quality information as control information is transmitted via a channel for use in data transmission.

BRIEF DESCRIPTION OF DRAWINGS

FIG. 9 illustrates another example of the procedure in the periodic feedback mode of the present embodiment.

FIG. 10 illustrates another example of the procedure in the periodic feedback mode on the present embodiment.

FIG. 11 illustrates an example of the procedure in an uplink data transmission in the present embodiment.

DESCRIPTION OF EMBODIMENTS

Embodiments of the present invention are described below with reference to the drawings. In the following discussion, like elements are designated with like reference symbols, and are identified with the same names and have the same functions. The detailed description thereof, once described, is not repeated.

Figure 1:
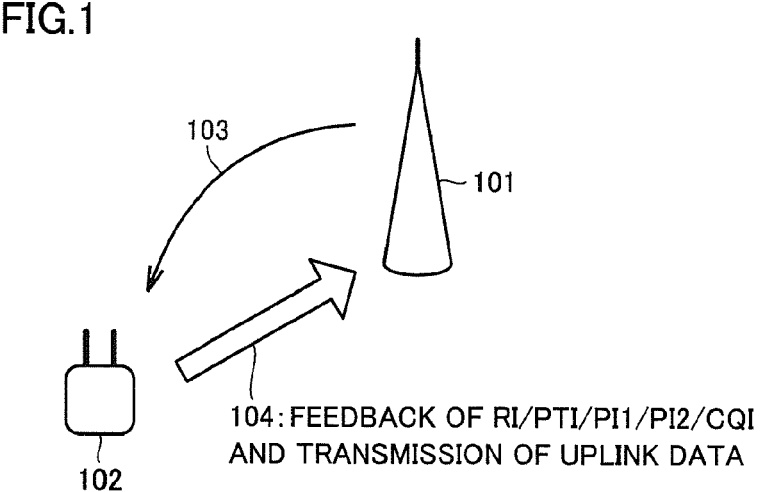
FIG. 1 diagrammatically illustrates a configuration of a communication system of an embodiment of the present invention.

FIG. 1 diagrammatically illustrates a configuration of a communication system of an embodiment of the present invention. The communication system of FIG. 1 is based on an LTE-A system. The communication system includes a base-station apparatus (a base station, a transmitter station, a downlink transmitter station, an uplink receiver station, eNodeB) 101 forming cells, and a terminal apparatus (a mobile station, a receiver station, an uplink transmitter station, a downlink receiver station, a mobile terminal, UE: User Equipment) 102.

When transmission parameters including MCS (Modulation and Coding Scheme), rank, and precoder are adaptively controlled on a downlink transmission signal 103 transmitted in Cell #0 and Cell #1, the terminal apparatus 102 performs a process described below. More specifically, the terminal apparatus 102 calculates reception quality information by referencing a downlink reference signal (RS: Reference Signal) included in a downlink transmission signal 103 transmitted from the base-station apparatus 101. For example, the reception quality information includes a rank indicator RI (Rank Indicator) specifying a preferred spatial multiplexing count, a plurality of pieces partial precoder information PI (Precoder Information) specifying preferred precoders (Preferred Precoder), and a channel quality indicator CQI (Channel Quality Indicator) specifying a preferred transmission rate (a modulation method, an encoding ratio, and a length of transport block). Next, the terminal apparatus 102 reports the calculated reception quality information to the base-station apparatus 101 via an uplink channel 104.

In the discussion that follows, the terminal apparatus 102 reports to the base-station apparatus 101 partial precoder information 1 (PI1 as first partial precoder information) and precoder information 2 (PI2 as second partial precoder information), as partial precoder information PI. For example, the terminal apparatus 102 specifies a preferred precoder W(i,j) using an index i represented by m bits as PI1, and an index j represented by n bits as PI2. Alternatively, the terminal apparatus 102 specifies a preferred precoder $W^{(r)}(i,j)$ using a rank r.

Here, W(i,j) is a matrix that is uniquely determined by i and j. A determination method of the matrix (codebook) is shared by the base-station apparatus 101 and the terminal apparatus 102. In other word, the codebook is a plurality of candidates of preferred precoders. A method of calculating a precoder that increases downlink reception signal power in view of a downlink transmission path may be used as a calculation method of a preferred precoder.

Figure 2:
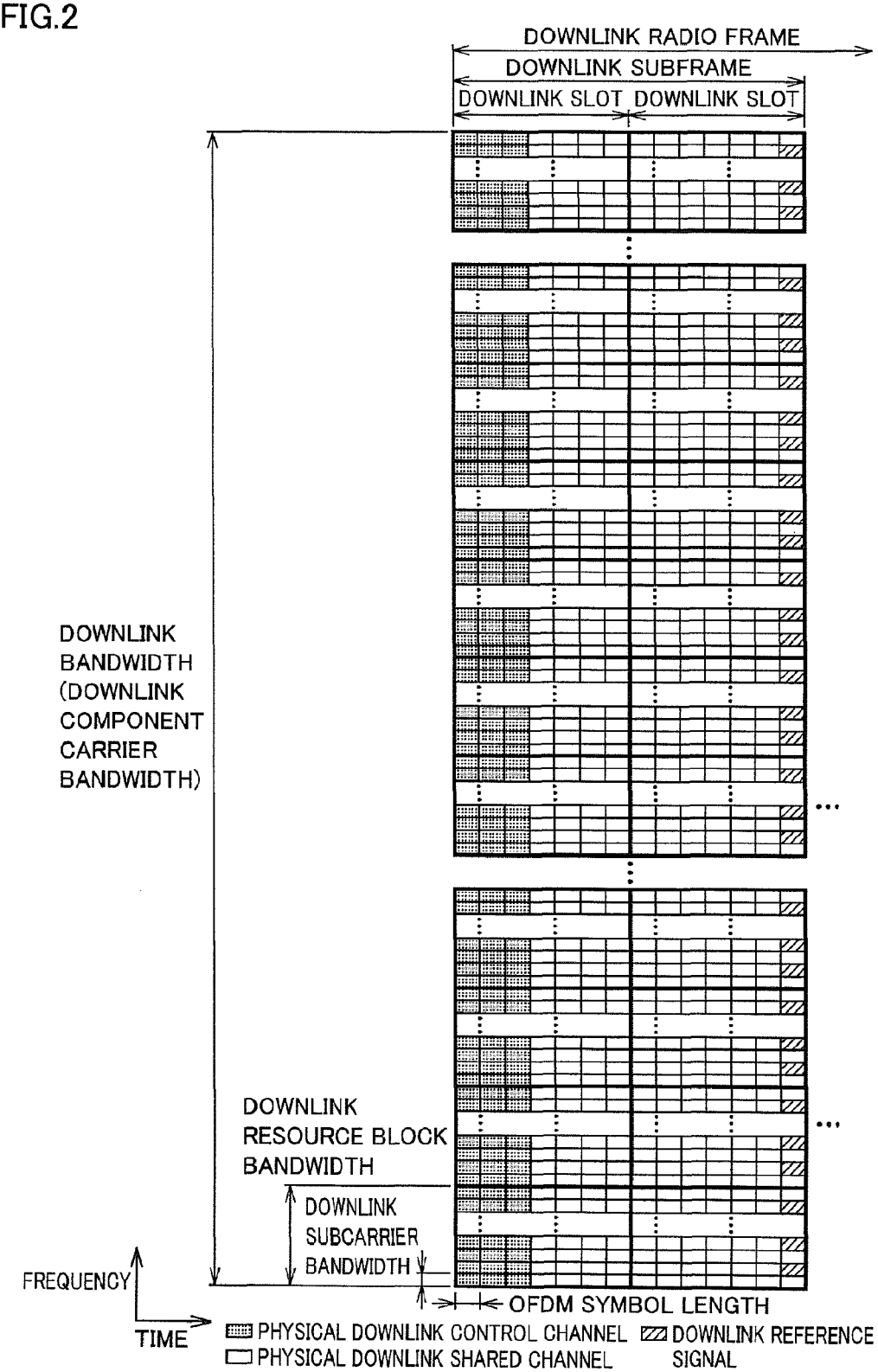
FIG. 2 illustrates an example of a downlink radio frame structure of the present embodiment.

FIG. 2 illustrates an example of a downlink radio frame structure of the present embodiment. Referring to FIG. 2, an OFDM (Orthogonal Frequency Division Multiplex) scheme is used in downlink. Assigned to the downlink are a physical downlink control channel (PDSCH), and a physical downlink shared channel (PDSCH). A downlink reference signal (RS) is multiplexed on a portion of PDSCH.

The downlink radio frame includes a downlink resource block (RB) pair. The downlink RB pair is a unit according to which the downlink radio resource is assigned. The downlink RB pair includes a predetermined frequency bandwidth (RB bandwidth) and a time band (two slots=one subframe).

One downlink RB pair includes two downlink RBs (RB bandwidth×slot) that are two consecutively linked in the time domain. One downlink RB includes 12 subcarriers in the frequency domain, and includes 7 OFDM symbols in the time domain.

A physical downlink control channel is a physical channel through which downlink control information is transmitted. The downlink control information may include a terminal apparatus identifier, scheduling information of a downlink shared channel, scheduling information of an uplink shared channel, a modulation method, an encoding ratio, and a retransmission parameter A downlink subframe in a single component carrier (CC) is illustrated. The downlink subframe may be defined on a per CC basis, and the downlink subframe is almost in synchronization with the CC.

Figure 3:
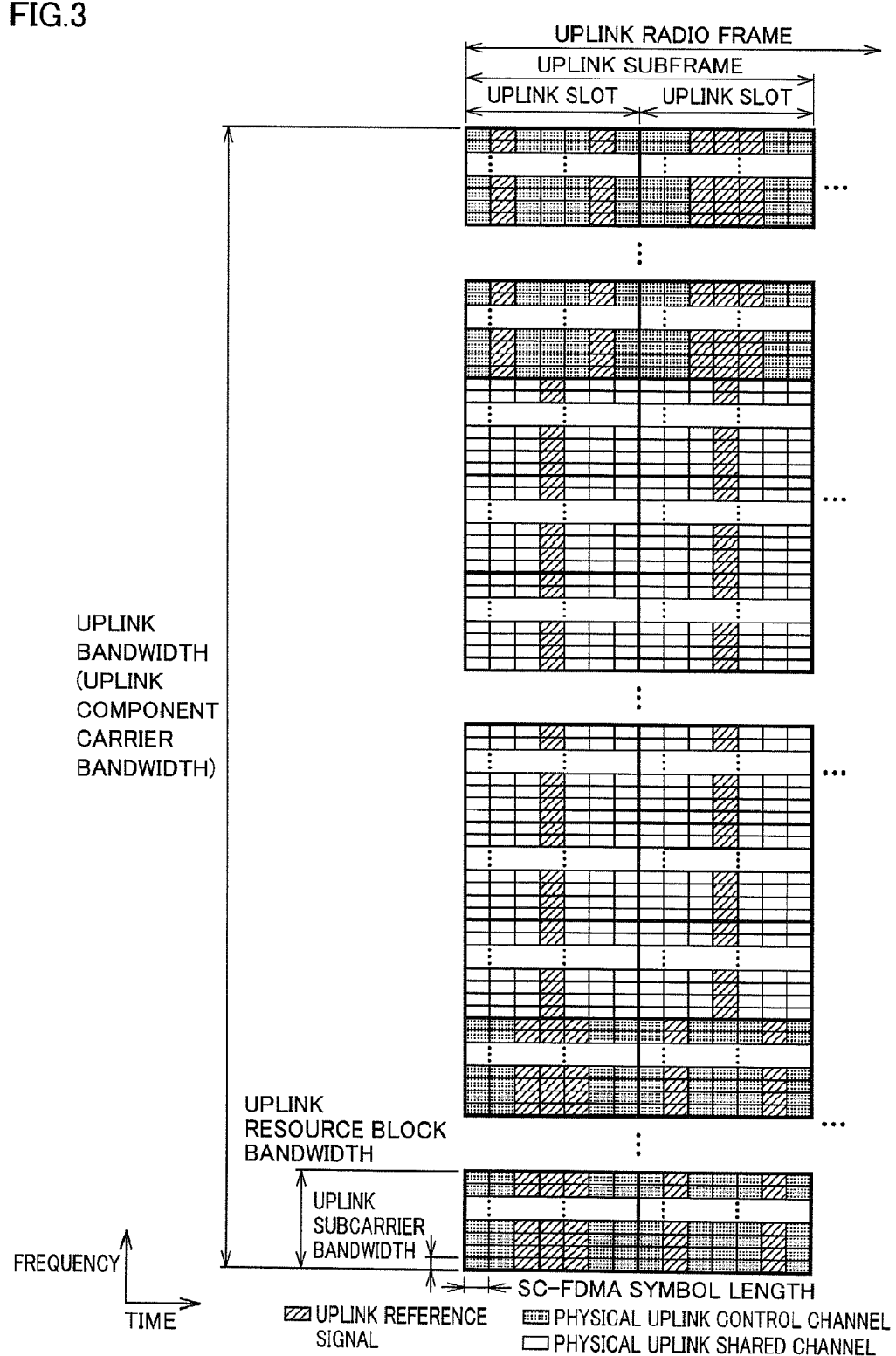
FIG. 3 illustrates an example of an uplink radio frame structure of the present embodiment.

FIG. 3 illustrates an example of an uplink radio frame structure of the present embodiment. Referring to FIG. 3, an SC-FDMA (Single Carrier-Frequency Division Multiple Access) scheme is used in uplink. Assigned to the uplink are a physical uplink shared channel (PUSCH), and a physical uplink control channel (PUCCH). An uplink reference signal (RS) is assigned on a portion of PUSCH or PUCCH.

The uplink radio frame includes an uplink RB pair. The uplink RB pair is a unit according to which the uplink radio resource is assigned. The uplink RB pair includes a predetermined frequency bandwidth (RB bandwidth) and a time band (two slots=one subframe).

One uplink RB pair includes two uplink RBs (RB bandwidth×slot) that are two consecutively linked in the time domain. One uplink RB includes 12 subcarriers in the frequency domain, and includes 7 SC-FDMA symbols in the time domain.

Figure 4:
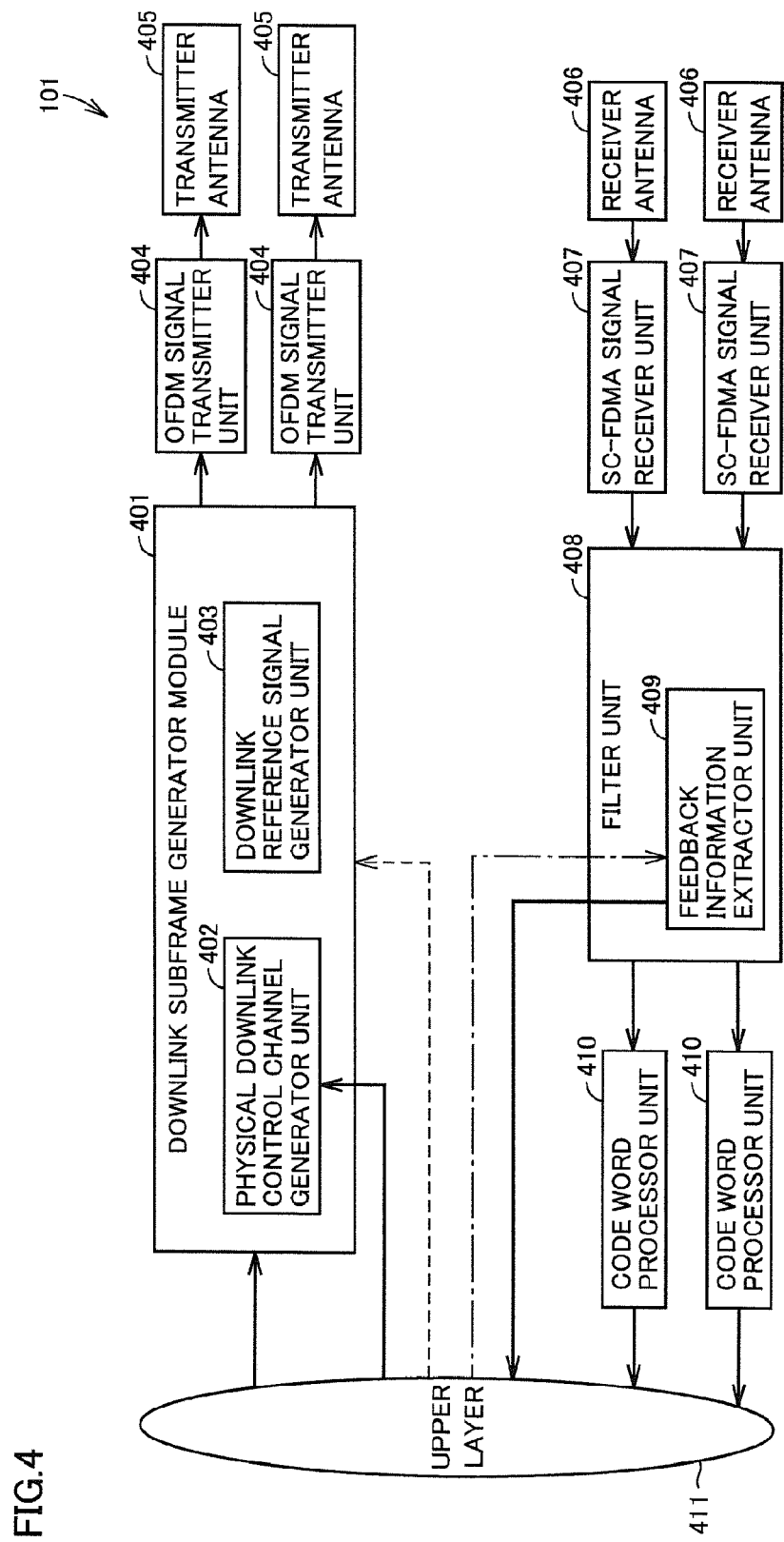
FIG. 4 illustrates an example of a block structure of a base-station apparatus of the present embodiment.

FIG. 4 is a block diagram diagrammatically illustrating the base-station apparatus 101 of the present embodiment. Referring to FIG. 4, the base-station apparatus 101 includes a downlink subframe generator module 401, OFDM signal transmitter units 404, a transmitter antenna (base-station transmitter antenna) 405, receiver antennas (base-station transmitter antennas) 406, SC-FDMA signal receiver units 407, a filter unit 408, a code word processor unit 412, and an upper layer 413. The downlink subframe generator module 401 includes a physical downlink control channel generator unit 402, and a downlink reference signal generator unit 403. The filter unit 408 includes a feedback information extractor unit 409.

Figure 5:
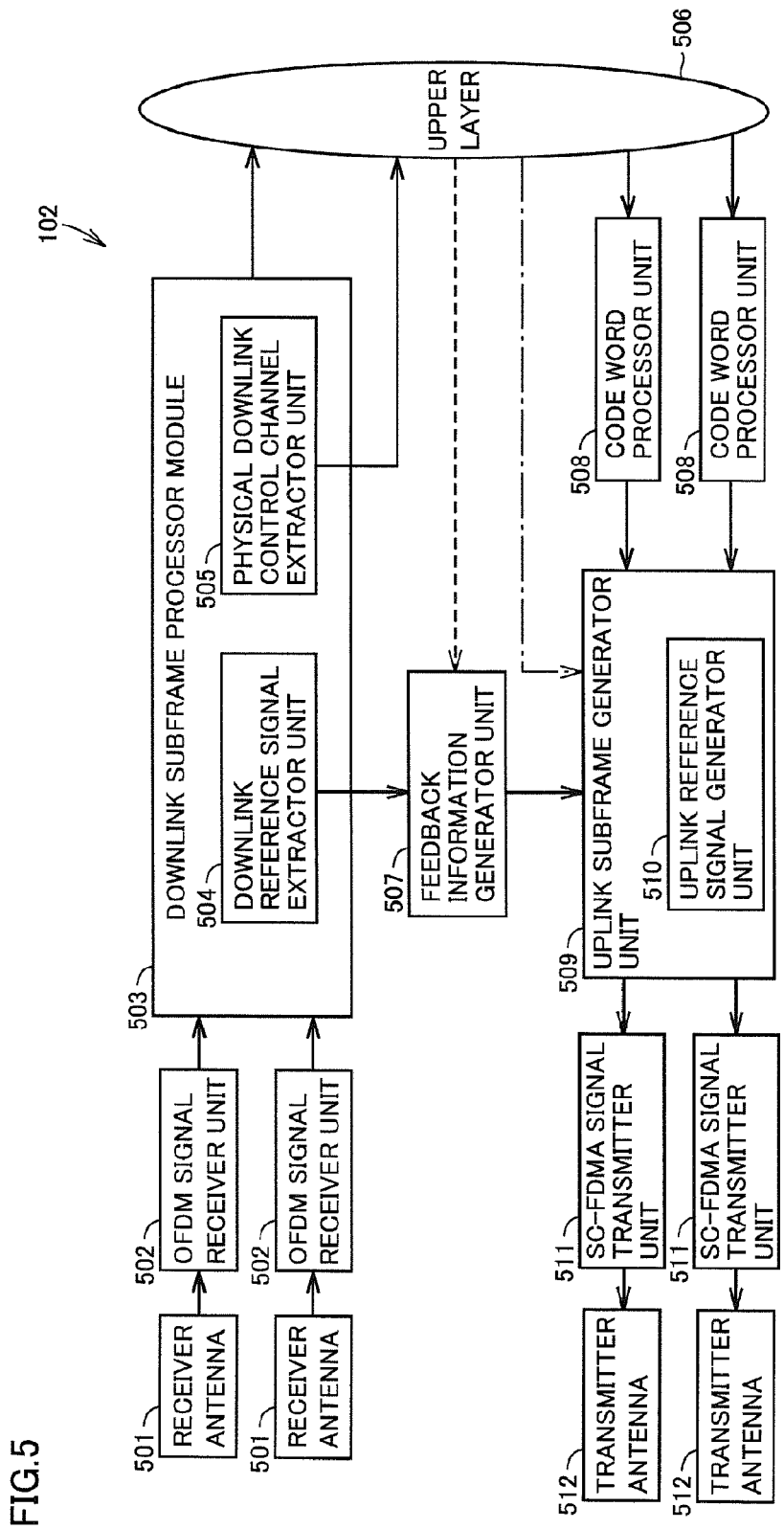
FIG. 5 illustrates an example of a block structure of a terminal apparatus of the present embodiment.

FIG. 5 illustrates an example of a block structure of the terminal apparatus 102 of the present embodiment. Referring to FIG. 5, the terminal apparatus 102 includes receiver antennas (terminal receiver antennas) 501, OFDM signal receiver units 502, a downlink subframe processor module 503, an upper layer 506, a feedback information generator unit 507, code word generator units 508, an uplink subframe generator unit 509, an SC-FDMA signal transmitter unit 511, and transmitter antennas (terminal transmitter antennas) 512. The downlink subframe processor module 503 includes a downlink reference signal extractor unit 504 and a physical downlink control channel extractor unit 505. The uplink subframe generator unit 509 includes an uplink reference signal generator unit 510.

Referring to FIGS. 4 and 5, a downlink flow of transmission and reception is described below. In the base-station apparatus 101, the downlink subframe generator module 401 performs a modulation process on transmission data (also referred to as a transport block) of each code word (a transmission data string in a physical layer) transmitted from the upper layer 411. The modulation process includes an error correction encoding operation, a rate matching operation, a PSK (Phase Shift Keying) modulation operation, and a QAM (Quadrature Amplitude Modulation) operation. The downlink subframe generator module 401 thus converts the transmission data into a modulation symbol string, the downlink subframe generator module 401 maps the modulation symbol string to a resource element (RE) that serves as a mapping unit of the modulation symbol string. The downlink subframe generator module 401 performs a preceding operation on the mapped modulation symbol string using a precoder specified by the upper layer 411. The RE in the downlink is defined in response to each subcarrier on the OFDM symbol. The transmission data string transmitted from the upper layer 411 includes control data for RRC (Radio Resource Control) signaling.

The physical downlink control channel generator unit 402 generates a physical downlink control channel in response to an instruction from the upper layer 411. Control information in the physical downlink control channel includes a transmission parameter in the downlink, a resource assignment in the uplink, a transmission parameter in the uplink, and CQI request. The downlink reference signal generator unit 403 generates a downlink reference signal DLRS (Down Link Reference Signal).

The downlink subframe generator module 401 maps the physical downlink control channel and DLRS to the RE in the downlink subframe. The OFDM signal transmitter unit 404 modulates a downlink subframe generated by the downlink subframe generator module 401. The OFDM signal transmitter unit 404 transmits via the transmitter antenna 405 an OFDM signal obtained through modulation.

In the terminal apparatus 102, the OFDM signal receiver unit 502 receives an OFDM signal via the receiver antenna 501. The OFDM signal receiver unit 502 performs an OFDM demodulation operation on the received OFDM signal. The downlink subframe processor module 503 extracts received data from the received downlink subframe, and then sends the extracted received data to the upper layer 506. More specifically, the downlink subframe processor module 503 extracts the received data from the downlink subframe by performing on the downlink subframe a demodulation operation and an error correction decoding operation as opposed to the modulation operation, the rate matching operation, and the error correction encoding operation performed by the downlink subframe generator module 401.

The downlink reference signal extractor unit 504 extracts DLRS generated by the downlink reference signal generator unit 403 and mapped by the downlink subframe generator module 401, and then sends the extracted DLRS to the feedback information generator unit 507. The physical downlink control channel extractor unit 505 extracts the control information included in the physical downlink control channel generated by the physical downlink control channel generator unit 402 and mapped by the downlink subframe generator module 401, and then sends the extracted control information to the upper layer 506.

The operations of the OFDM signal transmitter unit 404 and the transmitter antenna 405 in the base-station apparatus 101 and the operations of the receiver antenna 501, the OFDM signal receiver unit 502, and the downlink subframe processor module 503 in the terminal apparatus 102 are performed on each cell (CC) of the downlink. The feedback information generator unit 507 generates the reception quality information (feedback information) of a plurality of downlink cells.

With reference to FIGS. 4 and 5, the uplink flow of transmission and reception is described. In the terminal apparatus 102, the code word generator unit 508 converts the transmission data into a code word CW (Code Word) by performing operations including the error correction encoding operation, and the rate matching operation on the transmission data (also referred to as a transport block) on each code word transmitted from the upper layer 506.

In response to an instruction from the upper layer 506, the feedback information generator unit 507 generates feedback information by encoding RI, PI1, PI2, CQI and the like using the DLRS extracted by the feedback information generator unit 507. The uplink reference signal generator unit 510 generates an uplink reference signal ULRS (UpLink Reference Signal).

The uplink subframe generator unit 509 rearranges the code word modulation symbol string and the feedback information in accordance with a predetermined method. The uplink subframe generator unit 509 then maps the rearranged code word modulation symbol string and feedback information together with the uplink reference signal in the uplink subframe. The SC-FDMA signal transmitter unit 511 generates an SC-FDMA signal by performing an SC-FDMA modulation operation on the uplink subframe. The SC-FDMA signal transmitter unit 511 transmits the generated SC-FDMA signal via the transmitter antenna 512.

In the base-station apparatus 101, the SC-FDMA signal receiver unit 407 receives the SC-FDMA signal via the receiver antenna 406. The SC-FDMA signal receiver unit 407 performs an SC-FDMA demodulation operation on the received SC-FDMA signal. The downlink subframe processor module 503 extracts a code word from the received uplink subframe, and sends the extracted code word to the code word processor unit 410. The code word processor unit 410 extracts received data from the code word, and sends the extracted received data to the upper layer 411. More specifically, the code word processor unit 410 extracts the received data from the code word by performing on the code word a rate matching operation and an error correction decoding operation as opposed to the rate matching operation and the error correction encoding operation performed by the code word generator unit 508.

In response to an instruction from the upper layer 411, the feedback information extractor unit 409 in the filter unit 408 extracts the feedback information generated by the feedback information generator unit 507 and mapped by the downlink subframe generator module 401. The feedback information extractor unit 409 decodes the extracted feedback information and then sends the decoded feedback information to the upper layer 411. The filter unit 408 through a filtering operation thereof detects a signal on each code word by performing on each signal received via the receiver antenna 406 a ZF (Zero Forcing) operation, an MMSE (Minimum Mean Square Error) operation, and an MLD (Maximum Likelihood Detection) operation.

Figure 6:
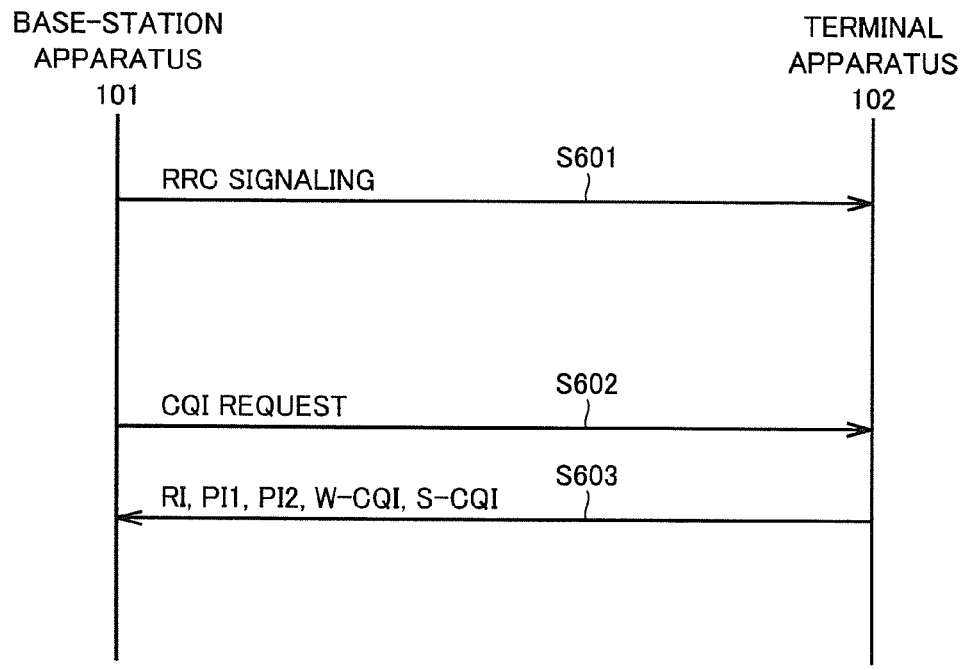
FIG. 6 illustrates an example of a procedure in a nonperiodic feedback mode of the present embodiment.

FIG. 6 illustrates an example of a procedure of the present embodiment. The procedure of FIG. 6 is a procedure in a nonperiodic feedback mode (the first feedback mode) in which RI, PI1, PI2, and W-CQI are nonperiodically fed back. First, the base-station apparatus 101 sets a feedback parameter in the terminal apparatus 102 via RRC signaling (step S601). The base-station apparatus 101 then notifies the terminal apparatus 102 of a CQI request that is information instructing a nonperiodic feedback (step S602). The base-station apparatus 101 assigns a resource (a physical uplink shared channel) that is notified of the feedback information at the same time.

The terminal apparatus 102 that is instructed to perform the nonperiodic feedback reports RI, PI1, PI2, and W-CQI to the base-station apparatus 101 at the same time (at the same timing) in accordance with the set feedback parameter (step S603). In the nonperiodic feedback mode for feeding back S-CQI, the terminal apparatus 102 further reports S-CQI to the base-station apparatus 101 at the same time. The terminal apparatus 102 here reports S-CQI of a plurality of bandwidths BP to the base-station apparatus 101 at the same time.

In the discussion here, the notification of the CQI request to the terminal apparatus 102 in step S602 is performed using dynamic signaling via the physical downlink control channel. The present invention is not limited to this method. For example, a similar advantage may be provided if the base-station apparatus 101 instructs the terminal apparatus 102 to perform the nonperiodic feedback using quasi-static signaling via the RRC signaling. In such a case, a subframe to be further reported is preferably specified.

Figure 7:
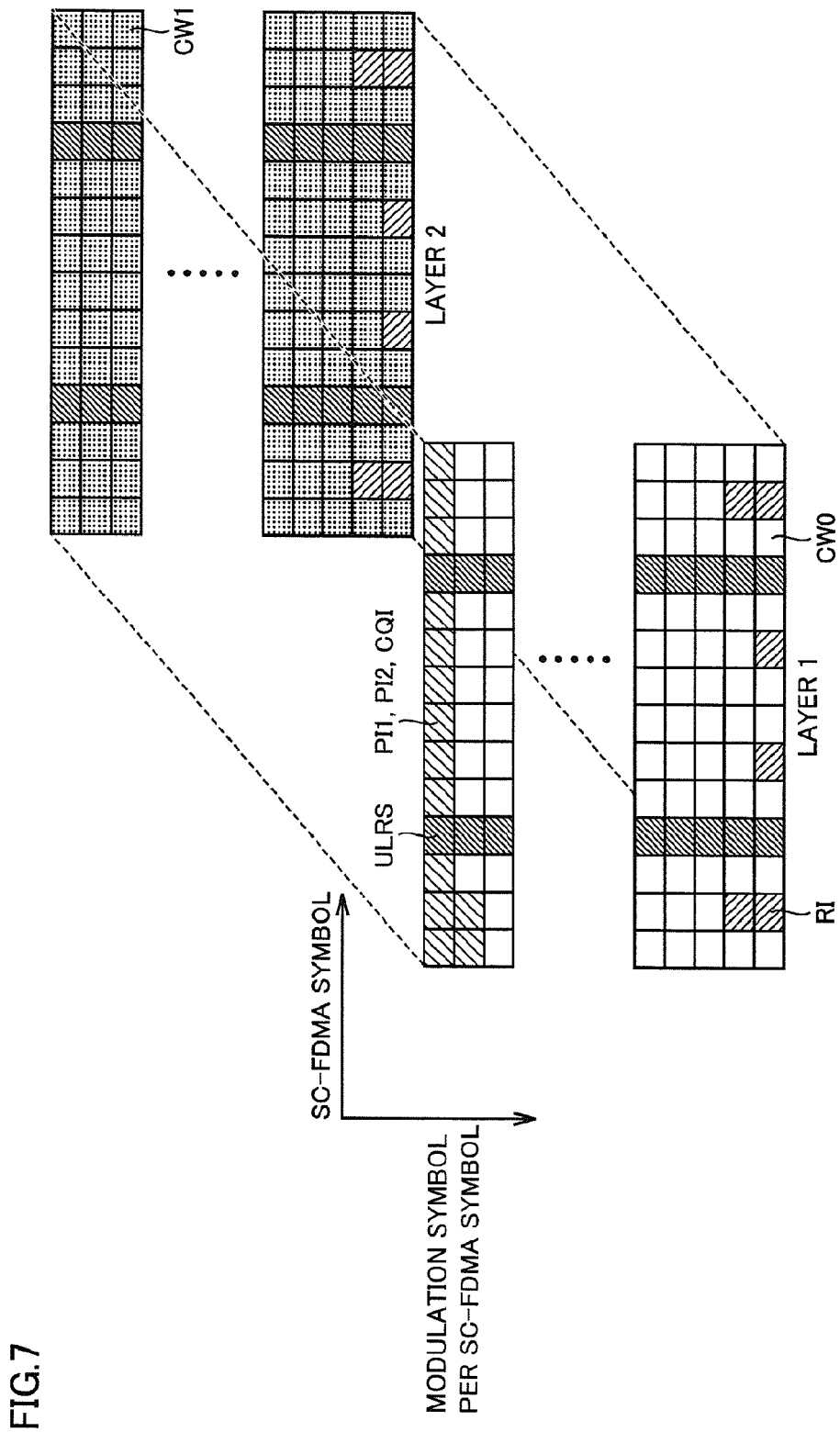
FIG. 7 illustrates a mapping example in the nonperiodic feedback mode of the present embodiment.

Mapping of the feedback information in the nonperiodic feedback mode is described next. FIG. 7 illustrates a mapping example of the feedback information. The rearrangement and mapping in FIG. 7 are applicable to the case in which a plurality of CWs (CW0 and CW1) over the uplink are transmitted. It is noted that CW0 and CW1 are transmitted using layer 1 and layer 2, respectively. The term "layer" refers to an index of spatial multiplexing. A term "layer count" refers to the spatial multiplexing count. The ULRS is mapped to fourth and eleventh SC-FDMA symbols at the layers. The feedback information including RI and the other feedback information (such as W-CQI, PI1, and PI2) are rearranged as illustrated in FIG. 7. The parameters herein are discussed for exemplary purposes only, and other parameters may be also be used. For example, if only CW0 is transmitted, the terminal apparatus 102 simply performs a mapping operation like the mapping operation at the layer 1 of FIG. 7.

More specifically, CQI, PI1, and PI2 are concatenated with CW0, first. In this case, the feedback information including CQI and PI2, and then CW0 are concatenated in that order. Concatenated symbol strings are rearranged beginning with the front ends of the strings, for example, in the order of a front end portion of a first SC-FDMA symbol at the layer 1, a front end portion of a second SC-FDMA symbol at the layer 1, . . . , a front end portion of a fourteenth SC-FDMA symbol at the layer 1, a second portion of the first SC-FDMA symbol at the layer 1 . . . and thus, the SC-FDMA symbols of the layer for transmission of CW0 are arranged for sequential mapping beginning with the front ends of the SC-FDMA. On the other hand, CW1 is rearranged beginning with the front ends of the strings in the order of a front end portion of a first SC-FDMA symbol at the layer 2, a front end portion of a second SC-FDMA symbol at the layer 2, . . . , a front end portion of a fourteenth SC-FDMA symbol at the layer 2, a second portion of the first SC-FDMA symbol at the layer 2 . . . and thus, the SC-FDMA symbols of the layer for transmission of CW1 are arranged for sequential mapping beginning with the front ends of the SC-FDMA. RI is rearranged so that RI is mapped to part or all of the SC-FDMA symbols adjacent to ULRS at all the layers (as illustrated in FIG. 7, for example, to a rear portion of each of second, sixth, ninth, and thirteenth SC-FDMA symbols at the layer 1 and the layer 2). More specifically, the terminal apparatus 102 transmits (reports) to the base-station apparatus 101 RI, CQI, PI1, and PI2 using different spatial multiplexing counts, or independent spatial multiplexing methods and mapping methods.

The uplink subframe generator unit 509 performs the rearrangement operation and the mapping operation in response to an instruction from the upper layer 506. On the other hand, the feedback information extractor unit 409 in the base-station apparatus 101 acquires the feedback information in response to an instruction from the upper layer 411 by performing a demapping operation as opposed to the mapping operation of the uplink subframe generator unit 509 and a rearrangement operation to restore an original rearrangement to reverse the rearrangement operation performed by the uplink subframe generator unit 509.

A codebook used in the calculation of PI1 and PI2 is described here. As previously described, the terminal apparatus 102 specifies the preferred precoder W(i,j) using an index i represented by m bits as PI1, and an index j represented by n bits as PI2. The codebook defines a maximum of $2^{m+n}$ types of W(i,j). In the nonperiodic feedback mode, the degree of freedom of feedback is increased by increasing the degree of freedom in the selection of W(i,j) in the codebook.

Figure 8:
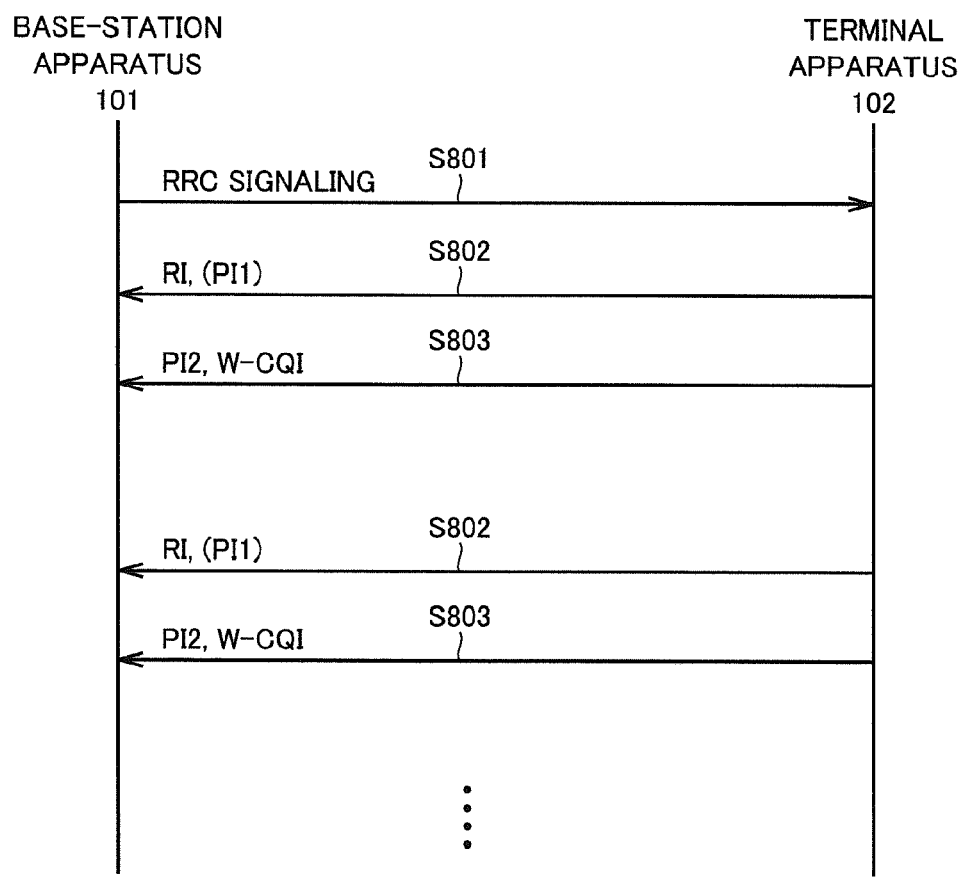
FIG. 8 illustrates an example of the procedure in a periodic feedback mode of the present embodiment.

FIG. 8 illustrates a procedure in a periodic feedback mode of the present embodiment. The procedure of FIG. 8 is an example of the procedure of a periodic feedback mode (a second feedback mode) in which RI, PI1, PI2, and W-CQI (Wideband CQI) in a cell are periodically fed back. It is noted that W-CQI is one type of CQI that represents a system bandwidth (component carrier bandwidth). The term feedback mode refers to settings including a combination of content of the reception quality information fed back from the terminal apparatus 102 to the base-station apparatus 101, a measurement method or a generation method of the content, a feedback method of the content, and a resource used in feedback.

The base-station apparatus 101 sets a parameter of the feedback in the terminal apparatus 102 via RRC signaling, and instructs the terminal apparatus 102 to perform a second feedback operation mode (step S801). The terminal apparatus 102 which has been instructed to perform the periodic feedback periodically reports PI, PI1 (step S802), PI2 and W-CQI (step S803) to the base-station apparatus 101 via a physical uplink control channel in accordance with the set feedback parameter. In the following discussion, the report in step S802 is referred to as a "feedback type 1A," and the report in step S803 is referred to as a "feedback type 1B."

FIG. 9 illustrates another example of the procedure in the periodic feedback mode of the present embodiment. The procedure of FIG. 9 is an example of the procedure of a periodic feedback mode (a third feedback mode) in which RI, PTI (Precoder Type Indication), PI1, PI2, W-CQI, and S-CQI (Subband-CQI) in a cell are periodically fed back. In the feedback mode in which S-CQI (Subband-CQI) is periodically fed back, the terminal apparatus 102 further reports S-CQI periodically. Here, S-CQI represents a bandwidth (Bandwidth Part) of a plurality of narrow bandwidths into which the system bandwidth (the component carrier bandwidth) is segmented. More specifically, BP includes one or more subbands (BP is segmented into the subbands), and S-CQI is the CQI of one of the subbands contained in BP. As will be described below, PTI is an index according to which the content to be fed back is switched.

First, the base-station apparatus 101 sets a feedback parameter in the terminal apparatus 102 via RRC signaling, and instructs the terminal apparatus 102 to perform the third instruction mode (step S901). The terminal apparatus 102 that has been instructed to perform the periodic feedback periodically reports RI and PTI (step S902) to the base-station apparatus 101 via the physical uplink control channel in accordance with the set feedback parameter.

If PTI reported in step S902 indicates a precoder that reports PI2 of each subband, the terminal apparatus 102 reports PI1 and W-CQI (step S903) and PI2 and S-CQI (step S903) periodically to the base-station apparatus 101 via the physical uplink control channel in accordance with the set feedback parameter. PI2 herein is the PI2 calculated on the subband corresponding to S-CQI concurrently transmitted.

On the other hand, if PTI reported in step 902 indicates a precoder that reports PI2 in the system bandwidth (component carrier bandwidth), the terminal apparatus 102 reports PI2 and W-CQI (step S905) and S-CQI (step S906) periodically to the base-station apparatus 101 via the physical uplink control channel in accordance with the set feedback parameter. In such a case, the terminal apparatus 102 uses a codebook that specifies a preferred precoder by reporting only PI2 instead of PI1. In the following discussion, the report in step S902 is referred to as a "feedback type 2A," the report in step S903 is referred to as a "feedback type 2B," the report in step S904 is referred to as a "feedback type 2C," the report in step S905 is referred to as a "feedback type 2D," and the report in step S906 is referred to as a "feedback type 2E." The feedback type 2D may include the report identical to that of the feedback type 1B, or the feedback type 2D may allow the calculation methods of PI2 and W-CQI to be individually set.

FIG. 10 illustrates another example of the procedure in the periodic feedback mode of the present embodiment. The procedure of FIG. 10 is an example of the procedure of a periodic feedback mode (a fourth feedback mode) in which RI, PI1, PI2, W-CQI, and S-CQI in a cell are periodically fed back. The base-station apparatus 101 sets a feedback parameter in the terminal apparatus 102 via RRC signaling, and instructs the terminal apparatus 102 to perform the fourth feedback mode (step S1001). The terminal apparatus 102 which has been instructed to perform the periodic feedback reports RI (step S1002) periodically to the base-station apparatus 101 in accordance with the set feedback parameter.

The terminal apparatus 102 next reports PI1, PI2, and W-CQI (step S1003) and S-CQI (step S1003) periodically to the base-station apparatus 101 via the physical uplink control channel in accordance with the set feedback parameter. Here, the report in step S1002 is referred to as a "feedback type 3A," the report in step S1003 is referred to as a "feedback type 3B," and the report in step S1004 is referred to as a "feedback type 3C." The feedback type 3C may include the report identical to that of the feedback type 2E, or the feedback type 3C may allow the calculation methods of S-CQI to be individually set.

FIG. 11 illustrates an example of the procedure of the uplink (UL) data transmission of the present embodiment. Referring to FIG. 11, the base-station apparatus 101 notifies the terminal apparatus 102 of a UL grant as the control information (step S1101). The control information includes allocation information that indicates an allocation of the physical uplink shared channel serving as a channel for uplink data transmission in the physical layer. The terminal apparatus 102 having been notified of the UL grant transmits UL data to the base-station apparatus 101 using the physical uplink shared channel indicated by the allocation information (step S1002).

In the periodic feedback mode, any of the feedback information reports (step S802, step S803, step S902, step S903, step S904, step S905, step S906, step S1002, step S1003, and step S1004) is typically performed via the physical uplink control channel as a channel for reporting the control information at the physical layer. However, if in step S1101, the physical uplink shared channel as a channel for transmitting data at the physical layer is allocated at the timing when any of the feedback information reports is performed, the terminal apparatus 102 reports the UL data together with the feedback information to the base-station apparatus 101 via the physical uplink shared channel. An operation of reporting the control information at the physical layer via the physical uplink shared channel instead of the physical uplink control channel is referred to as a "piggyback" operation.

Figure 12:
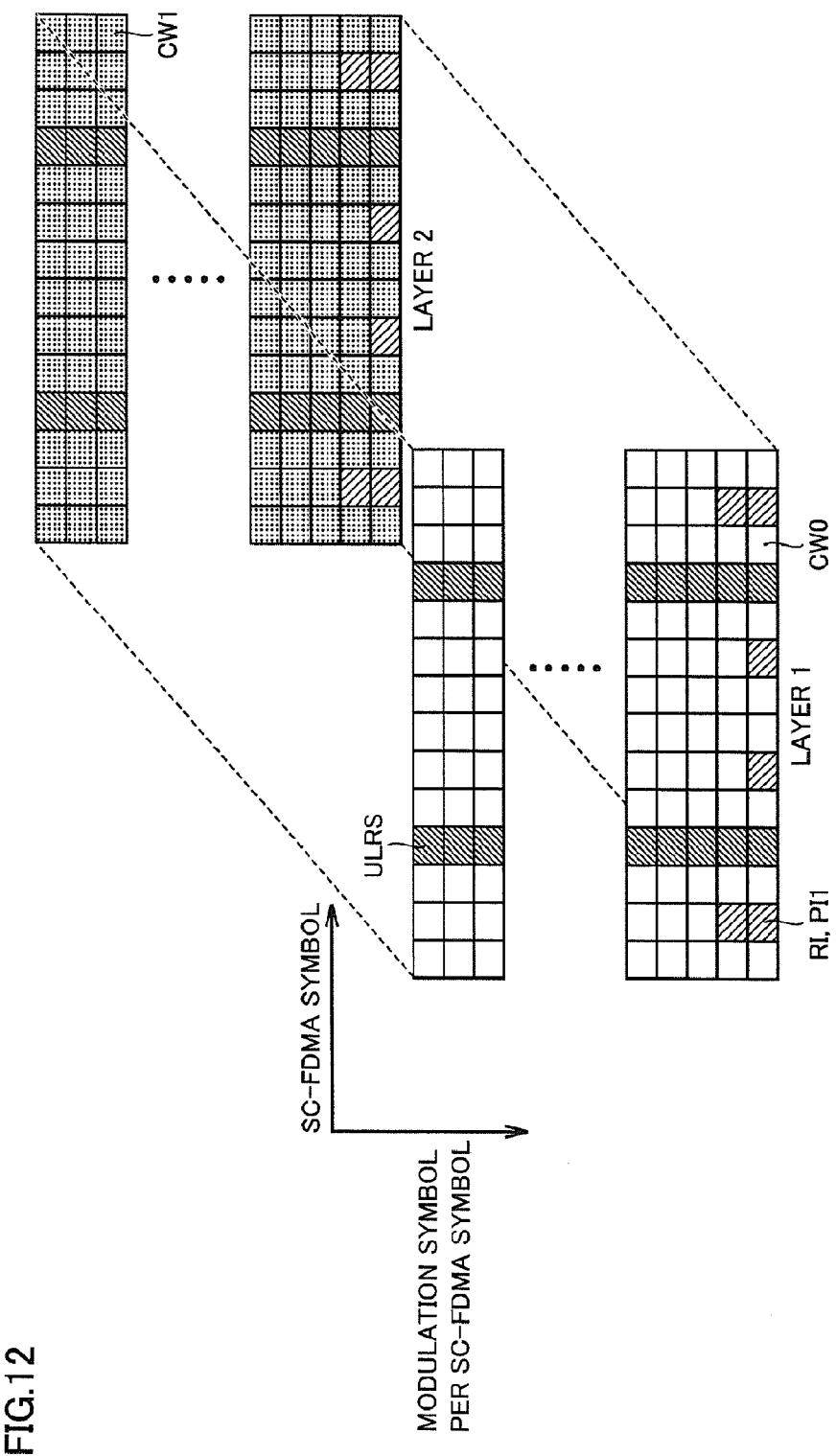
FIG. 12 illustrates a mapping example in a piggyback operation in the periodic feedback mode of the present embodiment.
Figure 13:
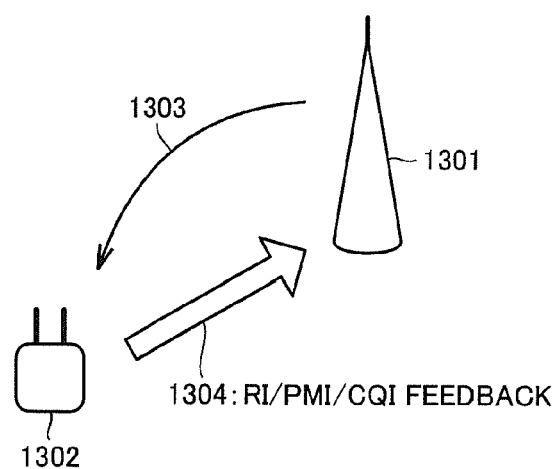
FIG. 13 diagrammatically illustrates a configuration of a communication system.

The mapping of the feedback information during the piggyback operation in the periodic feedback mode is described. FIG. 12 illustrates a mapping example of the feedback information. The rearrangement and mapping illustrated in FIG. 12 apply when a plurality of CWs (CW0 and CW1) are transmitted over the uplink. The following discussion is based on the assumption that CW0 and CW1 are transmitted using the layer 1 and the layer 2, respectively. The mapping discussed herein refers to the mapping of the feedback type 1A during the piggyback operation.

More specifically, the terminal apparatus 102 rearranges the feedback information including RI and PI1 so that the feedback information is mapped to part or all of the SC-FDMA symbols adjacent to ULRS at all the layers (as illustrated in FIG. 12, for example, to a rear portion of each of second, sixth, ninth, and thirteenth SC-FDMA symbols at the layer 1 and the layer 2). More specifically, the terminal apparatus 102 reliably transmits (reports) to the base-station apparatus 101 RI, and PI1 using a spatial multiplexing method independent of the UL data (in practice, using a method of reducing the spatial multiplexing count).

The uplink subframe generator unit 509 performs the rearrangement operation and the mapping operation in response to an instruction from the upper layer 506. On the other hand, the feedback information extractor unit 409 in the base-station apparatus 101 acquires the feedback information in response to an instruction from the upper layer 411 by performing a demapping operation as opposed to the mapping operation of the uplink subframe generator unit 509 and a rearrangement operation to restore an original rearrangement to reverse the rearrangement operation performed by the uplink subframe generator unit 509.

A codebook used in the calculation of PI1 and PI2 during the piggyback operation in the periodic feedback mode is described here. The codebook used herein is the same codebook as the one used in the nonperiodic feedback mode. In the periodic feedback mode, however, an overhead involved in the feedback information may be reduced by lowering the degree of freedom of the selection of W(i,j) in the codebook.

More specifically, the terminal apparatus 102 partially extracts (subsamples) a value taken by an index i represented by m bits as PI1 from $0, 1, \ldots, 2^m-1$, thereby setting the bit count needed by PI1 to be smaller than m bits. Similarly, the terminal apparatus 102 sets the bit count for PI2 to be smaller than n bits. The bit counts of PI1 and PI2 are thus reduced by restraining the number of types W(i,j) expressed by PI1 and PI2.

As described above, the terminal apparatus 102 multiplexes PI1 into a single CW when PI1 is reported to the base-station apparatus 101 via the physical uplink control channel in the nonperiodic feedback mode. On the other hand, the terminal apparatus 102 multiplexes PI1 into all the CWs when PI1 is reported to the base-station apparatus 101 via the physical uplink shared channel in the periodic feedback mode during the piggyback operation. In other words, the terminal apparatus 102 transmits PI1 by spatial-multiplexing PI1 in the same manner as the UL data when PI1 is reported to the base-station apparatus 101 via the physical uplink control channel in the nonperiodic feedback mode. On the other hand, the terminal apparatus 102 transmits PI1 via a spatial multiplexing method independent of a spatial multiplexing method of the UL data (in practice, with the spatial multiplexing count being 1) when PI1 is reported to the base-station apparatus 101 via the physical uplink shared channel in the periodic feedback mode during the piggyback operation.

When the terminal apparatus 102 reports the reception quality information to the base-station apparatus 101 via the physical uplink shared channel, the terminal apparatus 102 thus transmits the reception quality information in a reliable method if there is a possibility that the reception quality information may be a cause for erratic transmission. If the reception quality information may not be a cause for erratic transmission, the terminal apparatus 102 transmits the reception quality information using the method with the involved overhead reduced. For this reason, the terminal apparatus 102 can efficiently feed back the reception quality information.

When PI1 or PI2 is reported to the base-station apparatus 101 via the physical uplink shared channel in the nonperiodic feedback mode, the terminal apparatus 102 does not subsample the codebook of PI1 or PI2. On the other hand, when PI1 or PI2 is reported to the base-station apparatus 101 via the physical uplink shared channel in the periodic feedback mode during the piggyback operation, the terminal apparatus 102 subsamples the codebook of PI1 or PI2. In other words, the terminal apparatus 102 selects a preferred precoder from a group of candidates from among the plurality of preferred precoders. More specifically, when PI1 or PI2 is reported to the base-station apparatus 101 via the physical uplink shared channel in the nonperiodic feedback mode, the terminal apparatus 102 transmits PI1 or PI2 expressable by X bits to the base-station apparatus 101. On the other hand, when PI1 or PI2 is reported to the base-station apparatus 101 via the physical uplink shared channel in the periodic feedback mode during the piggyback operation, the terminal apparatus 102 transmits PI1 or PI2 expressable by Y bits (Y<X) to the base-station apparatus 101.

In this way, when the reception quality information is reported to the base-station apparatus 101 via the physical uplink shared channel, the terminal apparatus 102 transmits detailed reception quality information if a CQI request is received, and transmits the reception quality information through the method with the overhead reduced if no CQI request is received. For this reason, the terminal apparatus 102 may efficiently perform the feedback of the reception quality information.

In the above discussion, the terminal apparatus 102 reports PI1 to the base-station apparatus 101 in each feedback mode. The present invention is not limited to this method. For example, if the number of transmitter antennas of the base-station apparatus 101 is small, PI1 may not be reported. In such a case, the codebook may be arranged so that a preferred precoder is uniquely determined by PI2 only. The feedback type including PI1 may be a feedback type that reports content other than PI1.

A program implementing part or all of the functions of the base-station apparatus 101, and a program implementing part or all of the functions of the terminal apparatus 102 may be recorded onto a computer readable recording medium. The programs recorded on the computer readable recording medium may be read onto a computer system. The processes of each element of the base-station apparatus 101 and the terminal apparatus 102 may thus be executed by running the programs on the computer system. The term "computer system" refers to an OS (Operating System) and hardware such as peripheral devices.

The term "computer system" includes a homepage providing environment (or display environment) if a WWW system is used.

The term "computer readable recording medium" refers to a portable medium, such as a flexible disk, a magneto-optical disk, ROM, or CD-ROM, or a recording device, such as a hard disk, built into the computer system. The term "computer readable recording medium" may include a communication line that holds dynamically temporarily the program. The communication line transmits the program via a communication channel such as a network like the Internet or a telephone line. The "computer readable recording medium" may also include a volatile memory in the computer system that may be a server or a client and stores the program for a predetermined period of time. The program may implement part of the above-described function. The part of the above-described function may be used in combination with a program previously recorded on the computer system.

The processes of the elements may be implemented by integrating part or all of the functions of the base-station apparatus 101 into an integrated circuit, and part or all of the functions of the terminal apparatus 102 into an integrated circuit. The function blocks of the base-station apparatus 101 and the terminal apparatus 102 may be individually implemented using microchips, and part or all of the function blocks may be integrated into a microchip. The technique of integration is not limited to LSI. A dedicated circuit or a general-purpose processor may be employed. If a technique of circuit integration replacing the LSI appears with the advance of semiconductor technique, an integrated circuit resulting from the technique may also be used.

The embodiment of the present invention has been described in detail with reference to the drawings. The specific structure of the embodiment is not limited to the structure described above. A variety of design changes is possible without departing from the scope of the present invention. A variety of modification is possible without departing from the scope of the prevent invention. An embodiment resulting from combining technical means disclosed in the different embodiments may also fall within the scope of the present invention. The embodiments include elements that may have similar functions, and if an embodiment is constructed by interchanging the elements having the similar functions, such an embodiment may also falls within the scope of the present invention.

INDUSTRIAL APPLICABILITY

The present invention is preferable for use in a radio terminal apparatus, a radio base-station apparatus, a radio communication system, and a radio communication method.

REFERENCE SIGNS LIST

101 and 1301 Base-station apparatuses, 102 and 1302 Terminal apparatuses, 103, 1303 Downlink transmission signals, 104 and 1304 Feedback information, 401 Downlink subframe generator module, 402 Physical downlink control channel generator unit, 403 Downlink reference signal generator unit, 404 OFDM signal transmitter unit, 405 Transmitter antenna, 406 Receiver antenna, 407 SC-FDMA signal receiver unit, 408 Filter unit, 409 Feedback information extractor unit, 410 Code word processor unit, 411 Upper layer, 501 Receiver antenna, 502 OFDM signal receiver unit, 503 Downlink subframe processor module, 504 Downlink reference signal extractor unit, 505 Physical downlink control channel extractor unit, 506 Upper layer, 507 Feedback information generator unit, 508 Code word generator unit, 509 Uplink subframe generator unit, 510 Uplink reference signal generator unit, 511 SC-FDMA signal transmitter unit, 512 Transmitter antenna.

The invention claimed is:

1. A terminal apparatus configured to communicate with a base-station apparatus, the terminal apparatus comprising:
a transmitting circuit configured to report a first partial precoder information and a second partial precoder information together with data to the base-station apparatus via a channel for use in data transmission, the first partial precoder information and the second partial precoder information being included in reception quality information, wherein
a combination of the first partial precoder information and the second partial precoder information specifies at least one preferred candidate from among a plurality of candidates of precoders in case that the reception quality information is reception quality information that is to be aperiodically reported, and
a combination of the first partial precoder information and the second partial precoder information specifies at least one preferred candidate from among partial candidates of said plurality of candidates in case that the reception quality information is reception quality information that is to be periodically reported.

2. A base-station apparatus configured to communicate with a terminal apparatus, the base-station apparatus comprising:
an extraction circuit configured to extract a first partial precoder information and a second partial precoder information together with data from the terminal apparatus via a channel for use in data transmission, the first partial precoder information and the second partial precoder information being included in reception quality information, wherein
a combination of the first partial precoder information and the second partial precoder information specifies at least one preferred candidate from among a plurality of candidates of precoders in case that the reception quality information is aperiodically reported, and
a combination of the first partial precoder information and the second partial precoder information specifies at least one preferred candidate from among partial candidates of said plurality of candidates in case that the reception quality information is periodically reported.

3. A communication method of a terminal apparatus that is configured to communicate with a base-station apparatus, the communication method comprising:
reporting a first partial precoder information and a second partial precoder information in case that reception quality information is transmitted together with data via a channel for use in data transmission, the first partial precoder information and the second partial precoder information being included in reception quality information, wherein
a combination of the first partial precoder information and the second partial precoder information specifies at least one preferred candidate from among a plurality of candidates of precoders in case that the reception quality information is reception quality information that is to be aperiodically reported, and
a combination of the first partial precoder information and the second partial precoder information specifies at least one preferred candidate from among partial candidates of said plurality of candidates in case that the reception quality information is reception quality information that is to be periodically reported.

4. A communication method of a base-station apparatus that is configured to communicate with a terminal apparatus, the communication method comprising
extracting a first partial precoder information and a second partial precoder information in case that reception quality information reported together with data from the terminal apparatus via a channel for use in data transmission is extracted, the first partial precoder information and the second partial precoder information being included in reception quality information, wherein
a combination of the first partial precoder information and the second partial precoder information specifies at least one preferred candidate from among a plurality of candidates of precoders in case that the reception quality information is aperiodically reported, and
a combination of the first partial precoder information and the second partial precoder information specifies at least one preferred candidate from among partial candidates of said plurality of candidates in case that the reception quality information is periodically reported.

* * * * *